Figure 1:
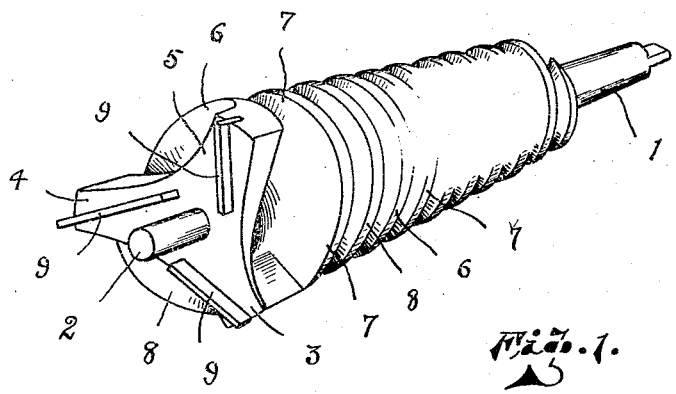

March 21, 1933.  C. F. LINDGREN  1,902,653

MEAT CHOPPER

Filed Dec. 1, 1930

Inventor
Chas F. Lindgren.
By Geo Stevens.
Attorney

Patented Mar. 21, 1933

1,902,653

UNITED STATES PATENT OFFICE

CHARLES F. LINDGREN, OF DULUTH, MINNESOTA

MEAT CHOPPER

Application filed December 1, 1930. Serial No. 499,137.

This invention relates to meat choppers and has special reference to a novel form of cutter head and feeding worm for such a device.

One object of the invention is that of producing a worm that will feed the meat more evenly to the cutter head.

Another object is to produce a head carrying a plurality of removable knives requiring no sharpening whatever.

Still another object is to produce a feeding screw and head requiring no forward bearing in the form of a stud or spindle, while other objects and advantages of the invention will appear in the following description thereof.

Figure 2:
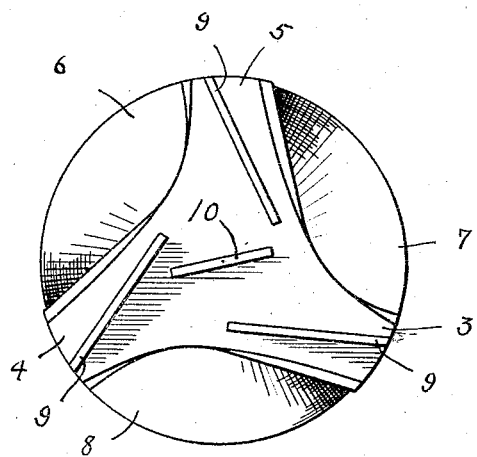

Referring now to the accompanying drawing forming part of this application, and wherein like reference characters indicate like parts:

Figure 1 is a perspective view of one of the improved feeding worms and cutter head, and Figure 2 is a front elevation of the head showing a slightly modified form thereof.

1 represents the shank of the worm and by which the latter is driven in the usual manner, and 2 represents the stud or pintle in the head of the worm which extends through the plate which is not shown; it being well known to those versed in the art that the adjustable plates on such a machine have different sized holes through which the meat is forced during the grinding process.

The head of my improved worm comprises three radially extending arm-like portions 3, 4 and 5, they being identical in form and each being an enlargement of its respective helical feeding blade. For example the blade 6 terminates in the arm 5, the blade 7 terminates in the arm 3, and the blade 8 terminates in the arm 4. The face of the head is flat and of course parallel with the plate when in position, and in each blade a tangently disposed rectangularly shaped cutting blade 9 is fixed, one end of which is flush with an arcuate terminus of its respective arm and the other end spaced radially from the center of the head substantially as shown. The cutting edges of these blades are flat and intended to bear their full thickness and length against the perforated plate on the machine. These blades are of uniform size throughout and are simply made to fit tightly in channels cut within the face of the head as illustrated, and as the head in its feeding process rotates anti-clockwise as viewed in the drawing, the frictional tendency of the meat on the blade causes same to be held firmly longitudinally in their respective recess, so that the device is exceedingly simple both in construction and installation, and inasmuch as the feeding and cutting process is divided into a plurality of units, it is quite obvious that a more evenly operated mechanism results, so much so that if desired the stud or pintle 2 may be removed entirely as the worm is automatically self centering. In such event however practice has proven that it is well to have a fourth cutting blade disposed transverse the center of the head as illustrated at 10 so that the entire surface of the plate or grid is engaged.

From the foregoing it is evident that I have produced an exceedingly simple and efficient feeding worm for meat cutters, and while I have shown but three helical feeding blades on the worm it is obvious that in a very large machine a greater number might be employed to advantage, and still be within the scope of the appended claims.

Having thus described my invention, what I claim and desire to secure by Letters Patent, is:

1. The combination with a worm of the class described having a plurality of cutting blades terminating in flat faced arms at the discharge end thereof and characterized by being supported axially only at one end, of a plurality of removable cutting blades installed within the flat terminus of the arms.

2. A worm of the class described comprising a plurality of cutting blades forming independent passages therebetween, each blade terminating at one end in a flat faced arm substantially at right angles to the axis of the worm, and a cutting knife removably disposed within the surface of each face and projecting substantially axially therefrom.

In testimony whereof I affix my signature.

CHARLES F. LINDGREN.